(12) United States Patent
Jain et al.

(10) Patent No.: US 8,200,187 B2
(45) Date of Patent: Jun. 12, 2012

(54) CELLULAR TELEPHONE CREDIT MANAGEMENT

(75) Inventors: Nikhil Jain, San Diego, CA (US); Dhinakar Radhakrishnan, San Diego, CA (US); Donald John Jones, Cardiff, CA (US)

(73) Assignee: QUALCOMM Incorporated, San Diego, CA (US)

( * ) Notice: Subject to any disclaimer, the term of this patent is extended or adjusted under 35 U.S.C. 154(b) by 795 days.

(21) Appl. No.: 11/240,075

(22) Filed: Sep. 29, 2005

(65) Prior Publication Data
US 2007/0072584 A1    Mar. 29, 2007

(51) Int. Cl.
H04M 11/00    (2006.01)
(52) U.S. Cl. .................. 455/405; 455/406; 455/407
(58) Field of Classification Search .......... 455/405, 455/406, 407
See application file for complete search history.

(56) References Cited

U.S. PATENT DOCUMENTS

| | | | |
|---|---|---|---|
| 5,636,140 A | 6/1997 | Lee et al. | |
| 6,375,073 B1 | 4/2002 | Aebi et al. | |
| 6,397,290 B1 | 5/2002 | Williams et al. | |
| 6,473,500 B1 * | 10/2002 | Risafi et al. | 379/144.01 |
| 6,526,302 B2 | 2/2003 | Hassett | |
| 6,697,422 B1 | 2/2004 | Mathai | |
| 6,704,563 B1 * | 3/2004 | Senn et al. | 455/406 |
| 6,782,253 B1 | 8/2004 | Shteyn et al. | |
| 6,912,382 B2 * | 6/2005 | Fellenstein et al. | 455/405 |
| 6,934,529 B2 * | 8/2005 | Bagoren et al. | 455/406 |
| 6,974,076 B1 * | 12/2005 | Siegel | 235/380 |
| 7,251,494 B2 | 7/2007 | Bates et al. | |
| 7,333,810 B2 * | 2/2008 | Preiss et al. | 455/432.3 |
| 2001/0005683 A1 | 6/2001 | Zicker et al. | |
| 2002/0016169 A1 | 2/2002 | Sykes et al. | |
| 2002/0072376 A1 | 6/2002 | Carlsson et al. | |
| 2003/0002632 A1 | 1/2003 | Bhogal et al. | |
| 2003/0027549 A1 * | 2/2003 | Kiel et al. | 455/405 |
| 2003/0169865 A1 | 9/2003 | Oren | |
| 2005/0003821 A1 | 1/2005 | Sylvain | |
| 2005/0105704 A1 * | 5/2005 | Harrison et al. | 379/114.2 |
| 2007/0117558 A1 | 5/2007 | Balwani | |

(Continued)

FOREIGN PATENT DOCUMENTS

CN    1459207 A    11/2003

(Continued)

OTHER PUBLICATIONS

International Search Report, PCT/US2006/038531, International Searching Authority, European Patent Office, Feb. 27, 2007.

(Continued)

*Primary Examiner* — Marivelisse Santiago Cordero
(74) *Attorney, Agent, or Firm* — Florin C. Corie (57) ABSTRACT

A system and method are provided for controlling a cellular telephone account User Terminal (UT). The method includes: registering a UT with an account in a cellular telephone network; uploading a credit for cellular telephone network services to the UT from a second party; and, converting the credit to an account balance. When the UT accesses a cellular telephone network service (i.e., makes a call), then the account balance is debited. In one aspect, the method accesses a credit server funded by the second party. Then, the credit is uploaded in response to accessing the credit server. For example, the credit server may be a module embedded in the UT. Alternately, the credit server is accessed via the cellular telephone network. For example, an Internet Protocol (IP) network-connected credit server may be accessed via the cellular network.

38 Claims, 4 Drawing Sheets

U.S. PATENT DOCUMENTS

2007/0167164 A1  7/2007  Kirla

FOREIGN PATENT DOCUMENTS

| | | |
|---|---|---|
| EP | 1 035 741 A2 | 9/2000 |
| EP | 1150482 | 10/2001 |
| EP | 1249995 | 10/2002 |
| EP | 1253771 A1 | 10/2002 |
| JP | 2000312386 A | 11/2000 |
| JP | 2001500644 T | 1/2001 |
| JP | 2001309445 A | 11/2001 |
| JP | 2002183626 A | 6/2002 |
| JP | 2002527964 T | 8/2002 |
| JP | 2002252729 A | 9/2002 |
| JP | 2002290540 A | 10/2002 |
| JP | 2004501546 T | 1/2004 |
| JP | 2004504341 T | 2/2004 |
| JP | 2005021358 A | 1/2005 |
| KR | 20020062578 | 7/2002 |
| KR | 20020076354 A | 10/2002 |
| KR | 20020093142 | 12/2002 |
| WO | WO0021316 A2 | 4/2000 |
| WO | 01/086985 A1 | 11/2001 |
| WO | WO0208863 A2 | 1/2002 |
| WO | WO2004105300 | 12/2004 |
| WO | WO2005031544 A2 | 4/2005 |
| WO | WO02005062657 A1 | 7/2005 |

OTHER PUBLICATIONS

Written Opinion, PCT/US2006/038531, International Searching Authority, European Patent Office, Feb. 27, 2007.
International Preliminary Report on Patentability, PCT/US2006/038531, The International Bureau of WIPO, Geneva, Switzerland, Apr. 1, 2008.
Taiwanese Search report—095134065—TIPO—May 16, 2010.

* cited by examiner

CELLULAR TELEPHONE CREDIT MANAGEMENT

CLAIM OF PRIORITY UNDER 35 U.S.C. §120

Reference to Co-Pending Applications for Patent

The present Application for Patent is related to the following co-pending U.S. patent application Ser. No. 11/239,926 "CELLULAR TELEPHONE SERVICE MANAGEMENT", filed concurrently herewith, assigned to the assignee hereof, and expressly incorporated by reference herein.

BACKGROUND

1. Field

This invention generally relates to wireless communications and, more particularly, to a credit management system and method for cellular network User Terminal (UT).

2. Background

A variety of telephone plans and payment options currently exist. A user may have multiple telephone accounts, such as a home phone number and a cellular phone number. Additionally, a user may establish and pay for a child's cellular phone account. Some service plans have a high monthly fee, but unlimited long distance calling. Other service plans have a low monthly fee, but a user is charged for on a per minute basis, and is also charged for long distance calls.

Conventionally, a user must contact a customer support number to make inquiries into long distance usage, toll calls, and local toll calls. Some service providers offer an online service using a web-based lookup system. In addition, the pay-as-you-go plans typically offer a call feature that provides account information from an accounting database (i.e., the number of paid minutes remaining in the account). This information may also include in-plan and out-of-plan billing information.

Conventionally, it is difficult to limit or control phone usage for an account. If a user wishes to control the use of a child's phone, the only practical method has been to use pre-paid telephone cards. Adding credit to such an account (i.e., buying a new card) is time consuming. However, using a credit card to automatically replenish the account defeats the management goals.

If a user wishes to modify their account options, the changes are typically communicated via fax, voice call, or email, where they are entered by a customer service representative. Such a process is not only costly and time consuming, but may also result in errors. Further, changes to some account management features are either not offered, or not encouraged.

The end result is that once a customer establishes an account, it is unlikely that the customer will make account modifications, even if the customer's needs change. Alternately, the number and kinds of account modifications that are offered to a customer are limited.

It would be advantageous if a cellular network account for a UT could be managed by a second party, even if the UT is in the possession of, and being used by a first party.

SUMMARY OF THE INVENTION

Accordingly, a method is provided for controlling a cellular telephone User Terminal (UT) account. The method comprises: registering a UT with an account in a cellular telephone network; uploading a credit for cellular telephone network services to the UT from a second party; and, converting the credit to an account balance. When the UT accesses a cellular telephone network service (i.e., makes a call), then the account balance is debited.

In one aspect, the method accesses a credit server funded by the second party. Then, the credit is uploaded in response to accessing the credit server. For example, the credit server may be a module embedded in the UT. Alternately, the credit server is accessed via the cellular telephone network. For example, an Internet Protocol (IP) network-connected credit server may be accessed via the cellular network.

In a different aspect, the credit is uploaded in a message received via a common control channel, such as a Short Message Service (SMS) message or a paging channel message. In another aspect, a credit upload message is automatically received from a credit server in response to registering with the cellular telephone network. In yet another aspect, the credit is uploaded via a hardwire connection, Bluetooth, IEEE 802.11, or IEEE 802.15 interface.

Additional details of the above-described method, a system for managing a cellular network UT account, and a UT with a managed cellular network account are provided below.

DETAILED DESCRIPTION

Figure 1:
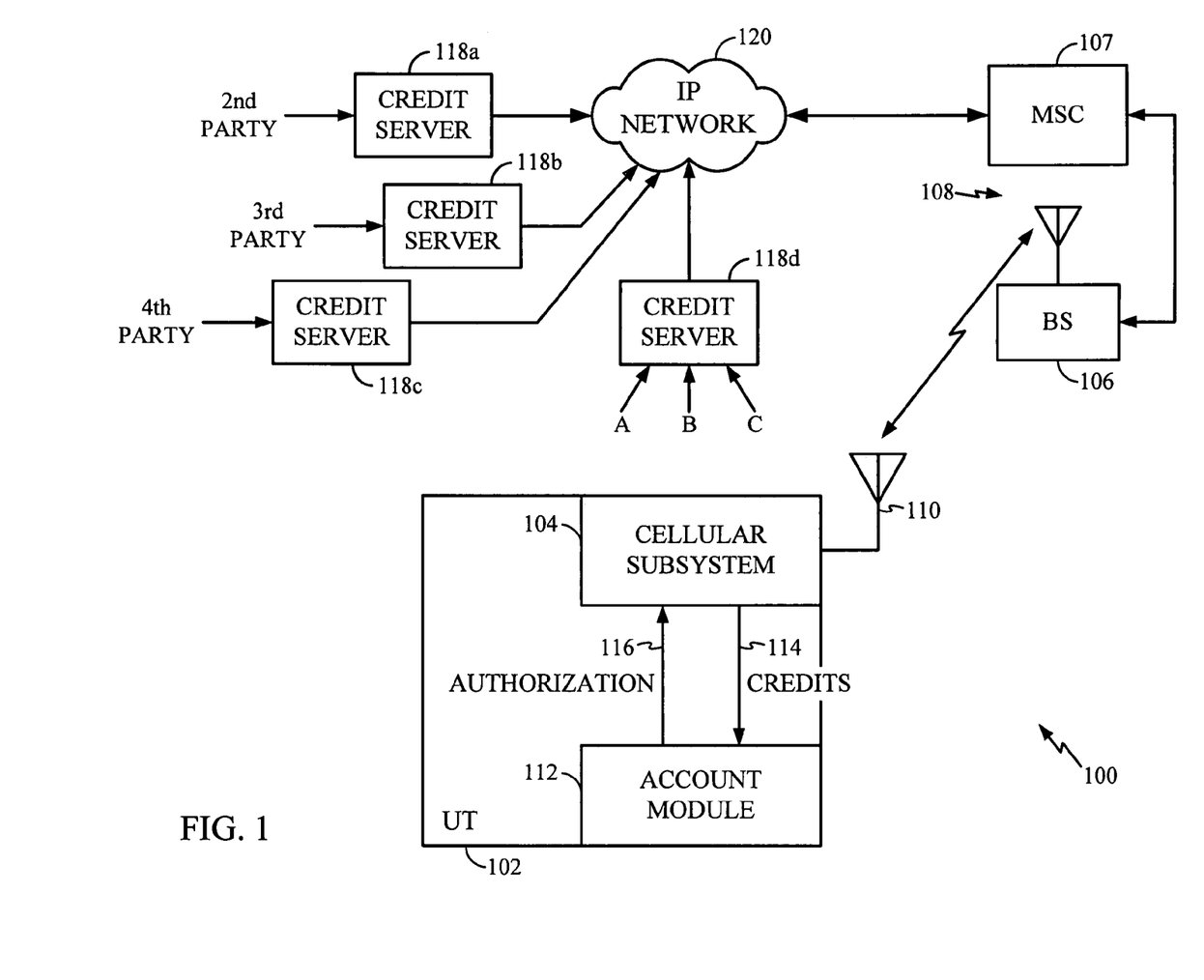
FIG. 1 is a schematic block diagram of a system for managing a cellular telephone network user terminal (UT) account.

FIG. 1 is a schematic block diagram of a system for managing a cellular telephone network user terminal (UT) account. The system 100 comprises a UT 102 with an account in a cellular network 108. The UT 102, in turn, comprises a cellular subsystem 104 having a wireless interface for registering the UT in the cellular telephone network 108, as represented with a Base Station (BS) 106 and Mobile Switching Center (MSC) 107. As explained below, a first party may be in possession of the UT 102, but receive account credits from a second party. As is understood by those skilled in the art, the wireless interface may include baseband, de/modulation, and transceiver circuitry not shown, but represented by antenna 110.

An account module 112 has an interface on line 114 for receiving cellular network service credits from a second party. The account module 112 converts the credits to an account balance. In a simple aspect, the credit is converted into a prepaid account balance, which is managed by the account module 112. The account module has an interface on line 116 connected to the cellular subsystem 106 for authorizing cellular network services in response to the account balance. That is, the cellular subsystem is permitted to request services from the cellular network 108, if the UT 102 has a positive balance. The account balance in the account module 112 is debited for cellular network services used. In this simple aspect there is only one account associated with the UT, which is funded by the second party. The billing for cellular network services used by the UT 102 is sent to the second party from the cellular network service provider.

In a different aspect, the cellular subsystem is associated with a plurality of accounts in the cellular network. For example, the first party (UT user) may have a conventional account with the network, which is billed on a monthly basis for actual minutes used. In additional, the UT may be equipped with an account module, as described above, which is funded by the second party. Alternately, the account module 112 receives cellular network service credits from a plurality of parties, where each party is associated with a unique account.

In this aspect, there may be a different credit server for each party. Shown are credit server 118a, funded by the second party, credit server 118b, funded by a third party, and credit server 118c, funded by a fourth party. For example, the first party may be a child that receives a monthly stipend from a parent, and also receives minutes from a commercial entity in response to completing customer surveys or questionnaires.

The account module 112 selects an account to be used, and debits the selected account balance in response to the cellular subsystem accessing a cellular telephone network service. Then, the account module 112 sends a notification to the cellular network 108, via the cellular subsystem 104, associating the cellular network services with the selected account.

In another aspect, the account module 112 accesses a credit server funded by a plurality of parties and uploads credit in response to accessing the credit server. As shown, credit server 118d is being funded by parties A, B, C, which may represent different merchants or banks, for example.

If the UT cellular subsystem is associated with multiple network accounts, the cellular network service provider must have a means of differentiating services that are being paid for by the different parties, from different accounts. To this end, the account module 112 sends a notification to the cellular network 108, via the cellular subsystem 104, associating the cellular network services with the selected account The credit server 118 has an Internet Protocol (IP) network interface on line 120 operatively connected to the UT account module 112, to supply the service credits from the second party. As shown, the credit server IP network interface 120 is connected to the cellular network 108. In this aspect, the account module 112 receives credit uploads from the credit server 118 via the cellular subsystem 104. For example, the credit can be uploaded in a control channel message or via a proprietary traffic channel. As shown below, the credit server may communicate with the account module via alternate paths.

Figure 2:
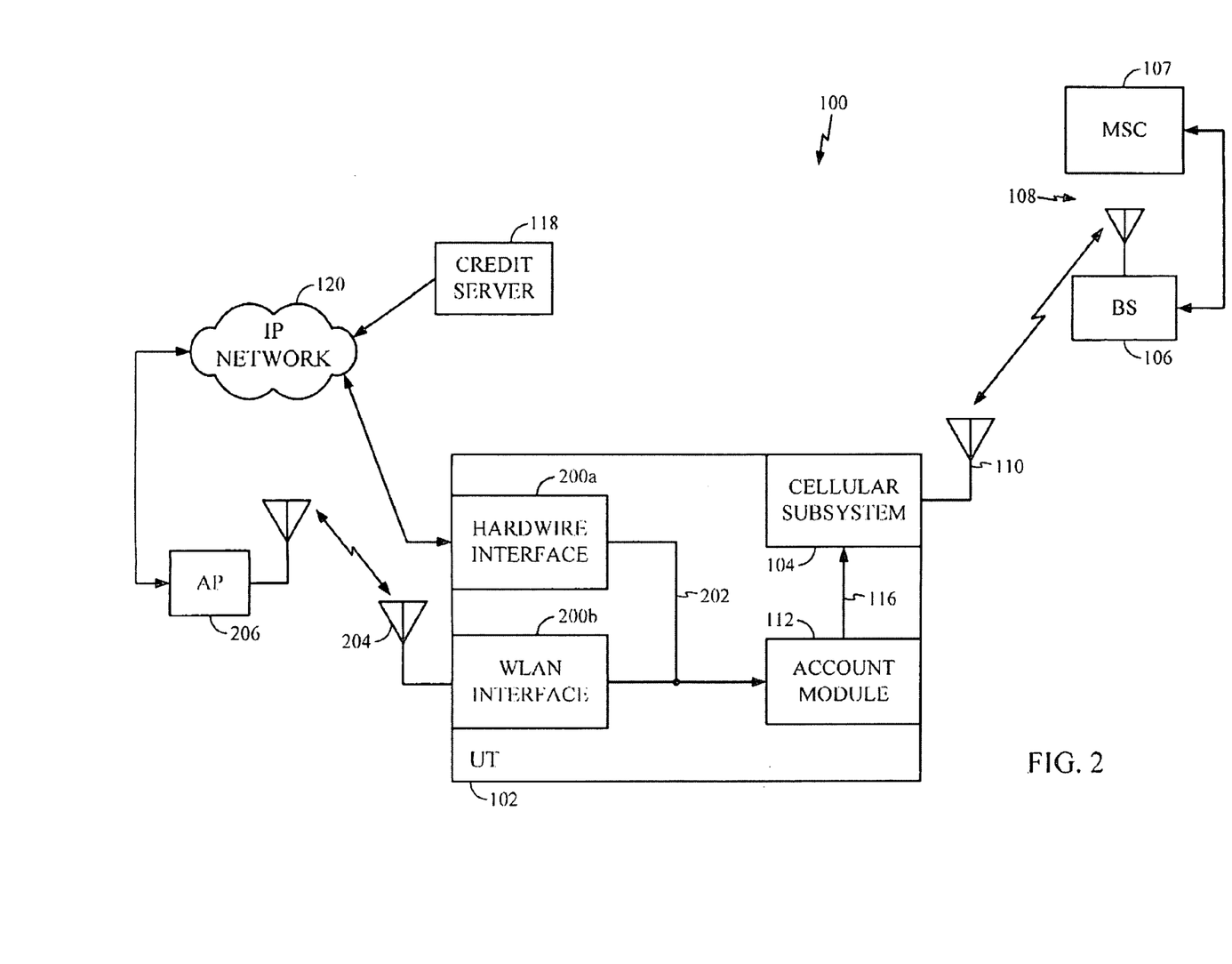
FIG. 2 is a schematic block diagram of a variation of the cellular network UT account management system of FIG. 1.

FIG. 2 is a schematic block diagram of a variation of the cellular network UT account management system of FIG. 1. In this aspect, the UT 102 further comprises an auxiliary subsystem 200. The auxiliary subsystem 200 may be a hardwire, Bluetooth, IEEE 802.11, or IEEE 802.15 interface, to name a few possibilities. For example, a hardwire interface 200a may be used to download a credit upload as an email attachment, or to download a credit from a website, in which case the UT would include a browser or email application. If the auxiliary subsystem is a Wireless Local Area Network (WLAN) 200b, then credit is uploaded to the UT via a wireless interface connected to a WLAN network, as represented with Access Point (AP) 206. As is understood by those skilled in the art, the WLAN interface 200b may include baseband, de/modulation, and transceiver circuitry not shown, as represented with an antenna 204.

Using either variation, the auxiliary subsystem 200 is able to receive credits from the credit server IP network interface 120. The account module 112 has an interface 202 connected to the auxiliary subsystem 200 for receiving credit uploads from the credit server 118.

Figure 3:
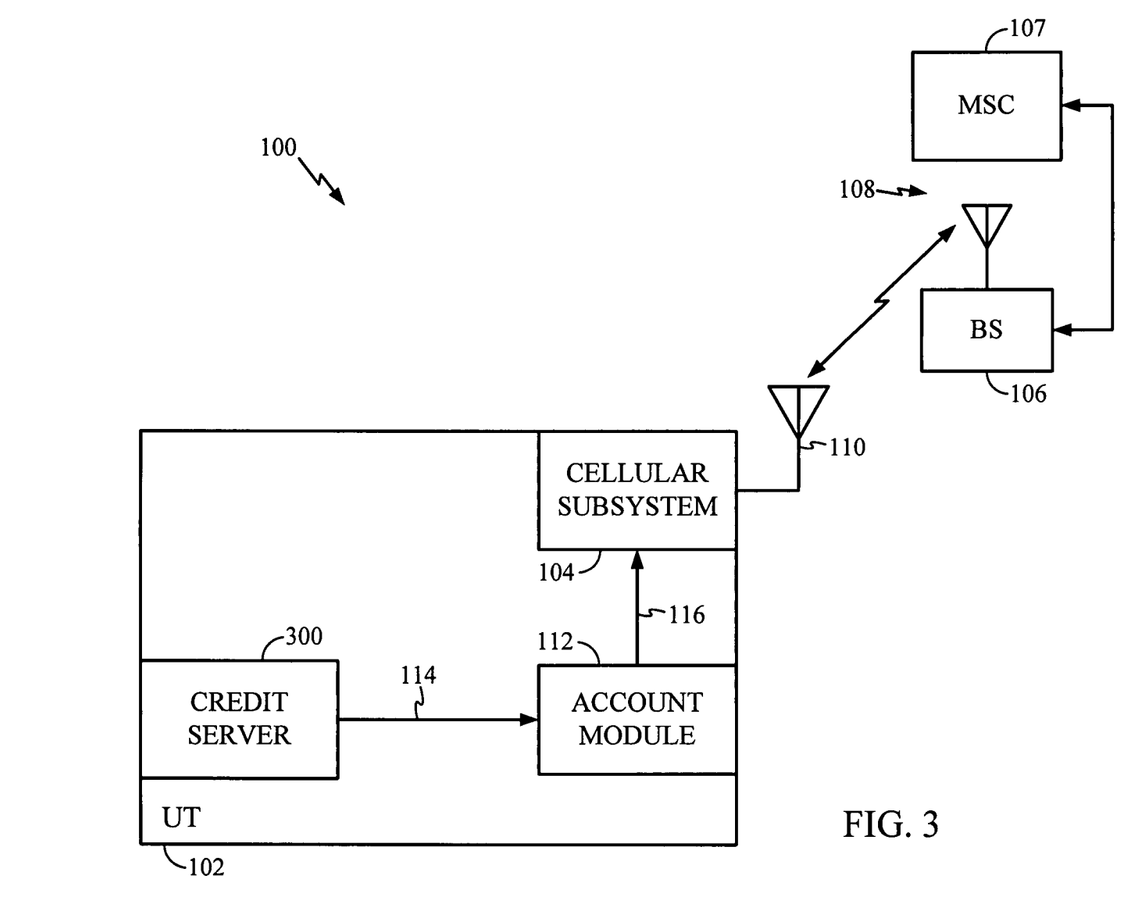
FIG. 3 is a schematic block diagram a UT with a managed cellular telephone network account.

FIG. 3 is a schematic block diagram a UT with a managed cellular telephone network account. As an alternate to the above system approaches, the invention can be understood from the perspective of a UT with a managed cellular telephone network account. As mentioned above, the UT 102 comprises a cellular subsystem 104 having a wireless interface for registering the UT 102 in a cellular telephone network 108. An account module 112 has an interface 114 for receiving cellular network service credits from a second party and converting the credits to an account balance (i.e., a first party prepaid account balance).

The account module 112 has an interface 116 connected to the cellular subsystem 104. The account module 112 debits the account balance in response to the cellular subsystem 104 accessing a cellular telephone network service. For simplicity, it can be understood that interface 116 only permits the UT to debit credit balances from the second party, if a positive account balance exists in the module.

The account module 112 accesses a credit server associated with the second party and uploads credit in response to accessing the credit server. As shown in FIG. 3, the UT 102 further comprises a credit server 300. That is, the credit server is embedded in the UT 102 and has an interface on line 114 connected to the account module 112.

It should be understood that the first party (in possession of the UT 102) may have a conventional account with the cellular network 108, meaning that the first party has an account with the network, and receives invoices from a cellular network provider for network services (i.e., making calls). In this aspect, the account module 112 permits first party to use cellular network services on credit, as a reward, or on a stipend from the second party. In this case, the cellular network provider bills the second party, who provided the credit to the account module 112.

Alternately, the UT cellular network account is completely held by the second party. In this case, the first party has no financial relationship with the cellular provider, but rather, only receives credits as a result of their relationship with the second party. For example, the first party may be a child and the second party the child's parent. As another example, the second party may be a commercial entity who buys minutes from the cellular network provider 108, and resells the minutes to the first party. In this case, the credit server can be said to provide credits to an account associated with the UT, where the account is ultimately held by the second party.

In one aspect, the credit server 300 and account module 112 include a microprocessor and memory to execute instructions using a Binary Runtime Environment for Wireless (BREW) application and API connected to a cellular subsystem 104. Alternately, other software languages can be used, or instructions can be carried out using a state machine such as a programmable gate array.

In another aspect, The UT's operating system is configured in a manner that permits a party to become a financial entity capable of funding UT accounts via the credit server. For example, a BREW API may be configured to enable this functionality.

Embedding both the credit server 300 and the account module 112 in the UT 102 makes for seamless communications between the two components. In the event that the second party wishes to communicate with the credit server, to add additional credit for example, the second party can communicate to the server 300 via the cellular subsystem 104, using control channels for example. Otherwise, the second party can communicate with the server 300 through an auxiliary hardline or WLAN subsystem (not shown).

Alternately as shown in FIG. 1, the account module 112 accesses a cellular network-connected credit server 118 via the cellular subsystem 104. As shown in FIG. 1, the account module 112 has an interface 114 connected to the cellular subsystem 104 to receive credit uploaded in a message received via a common control channel, such as a SMS message or paging channel message.

As another alternative, see FIG. 2, the UT 102 further comprises a auxiliary subsystem 200. Shown are a hardwire interface 200a and a WLAN interface 200b. The WLAN interface 200b is intended to represent a Bluetooth, IEEE 802.11, or IEEE 802.15 wireless interface. However, the UT 102 is not limited to any particular type of auxiliary interface. As described above, the account module 112 has an interface 202 connected to the auxiliary subsystem 200 for receiving credit uploads.

Functional Description

Figure 4:
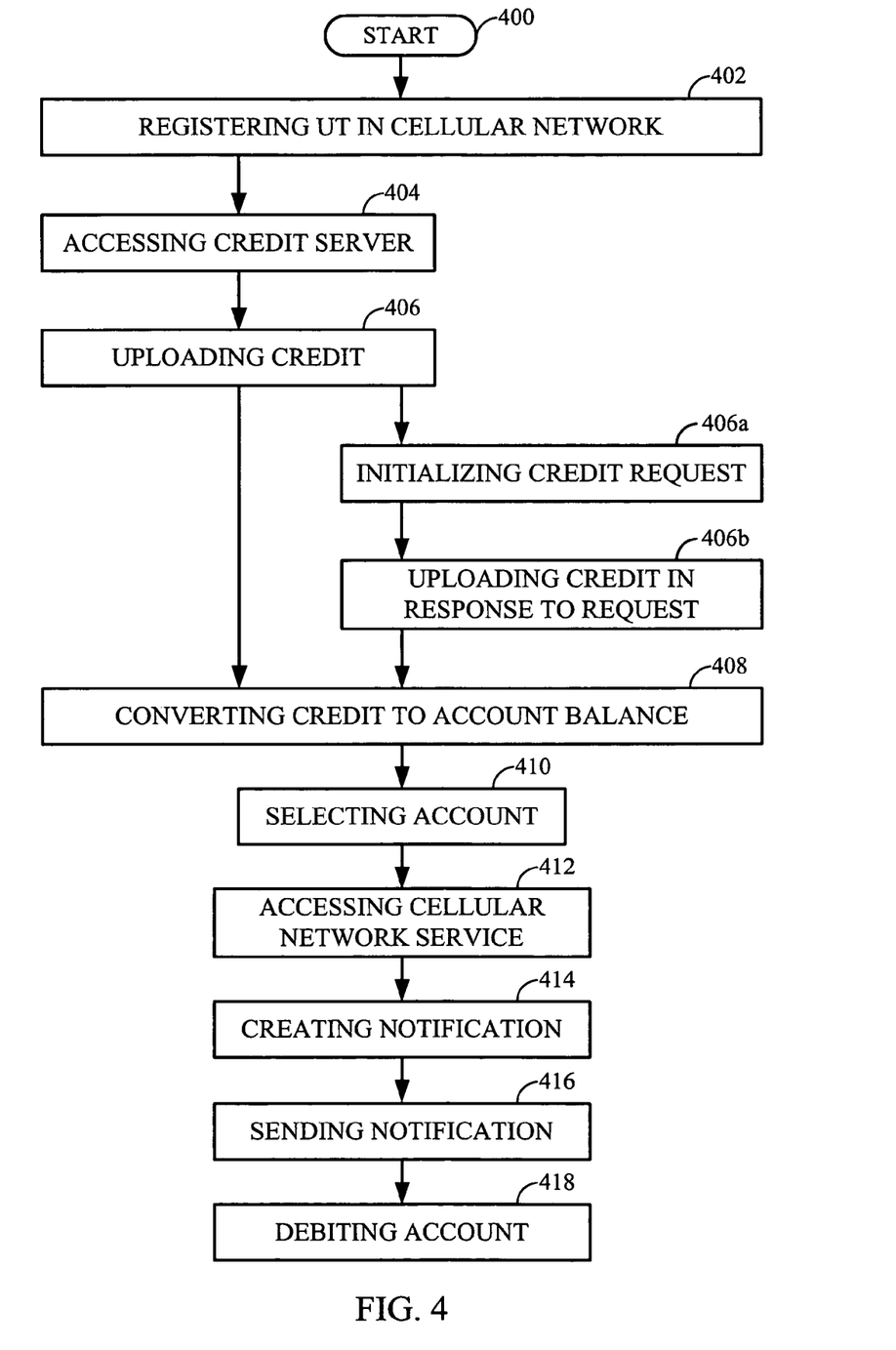
FIG. 4 is a flowchart illustrating a method for controlling a UT cellular telephone account.

FIG. 4 is a flowchart illustrating a method for controlling a UT cellular telephone account. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 400.

Step 402 registers a UT in a cellular telephone network. As described above, in different aspects the UT account can be considered held by either the first or the second party. Step 404 accesses a credit server funded by the second party. Alternately, Step 404 accesses a credit server funded by a plurality of parties. Step 406 uploads a credit for cellular telephone network services, to the UT from a second party, in response to accessing the credit server. Step 408 converts the credit to an account balance, a first party prepaid account balance for example.

In one aspect, registering the UT in Step 402 includes registering a UT having a plurality of accounts in a cellular network. Then, Step 410 selects an account. Step 412 accesses a cellular telephone network service. Step 414 creates a notification associating the cellular network services with the selected account. Step 416 sends the notification to the cellular network, typically via the cellular subsystem. Step 418 debits the selected account balance, in response to accessing the service. In a related variation, uploading credit in Step 406 includes uploaded credit from a plurality of parties, where each party is associated with a unique account.

In one aspect, accessing the credit server funded by the second party in Step 404 includes accessing a credit server embedded in the UT. In another aspect, accessing the credit server in Step 404 includes accessing the credit server via the cellular telephone network. For example, an IP network-connected credit server is accessed via the cellular network. The credit can be uploaded (Step 406) in a message received via a common control channel, such as an SMS message or a paging channel message.

As yet another alternative, uploading the credit in Step 406 includes uploading the credit via a hardwire connection, Bluetooth, IEEE 802.11, or IEEE 802.15 interface.

In another aspect, Step 406 automatically receives a credit upload message from a credit server in response to registering with the cellular telephone network. As an alternative, uploading the credit in Step 406 includes substeps. Step 406a initializes a credit request, and Step 406b uploads the credit in response to the request. Note, this communication can be carried out using a cellular, WLAN, or hardwire interface.

More specifically, initializing the credit request in Step 406a includes additional substeps (not shown). Step 406a1 accesses a URL associated with the second party. Step 406a2 downloads a form. Step 406a3 populates the form, and Step 406a4 submits the populated form to the URL. The methodology supports a second party whose creates a reward of cellular networks minutes or account credit, for a user that completes a survey or who answers a questionnaire.

In a different aspect, initializing the credit request in Step 406a includes alternate substeps (not shown). Step 406a5 establishes a call (i.e., via the cellular network) to a telephone number associated with the second party. Step 406a6 receives prompts via the call. Step 406a7 (the first party) responds to the prompts. Again, this methodology supports a second party who creates a reward of cellular network minutes or account credit, for a user that completes a survey or who answers a questionnaire via a UT.

A system and method for controlling a UT cellular network account have been provided. Some examples have been provided of the account parameters that can be managed. Some examples have also been provided of means of downloading and supplying credit. However, the invention is not limited to merely these examples. Other variations and embodiments of the invention will occur to those skilled in the art.

What is claimed is:

1. In a cellular telephone network user terminal (UT), a method for controlling a cellular telephone account, the method comprising:
    registering a UT having a plurality of accounts in a cellular telephone network, wherein the UT is associated with a first party;
    selecting an account from the plurality of accounts;
    uploading a credit to the selected account for a cellular telephone network service;
    converting the credit to an account balance associated with the selected account;
    accessing the cellular telephone network service;
    creating a notification associating the cellular telephone network service with the selected account;
    sending the notification to the cellular telephone network; and
    debiting the account balance associated with the selected account.

2. The method of claim 1 wherein uploading credit includes uploading credit from a plurality of parties, where each party is associated with a unique account.

3. The method of claim 1 further comprising:
    accessing a credit server funded by a second party; and,
    wherein uploading the credit includes uploading the credit in response to accessing the credit server.

4. The method of claim 3 wherein accessing the credit server funded by the second party includes accessing a credit server embedded in the UT.

5. The method of claim 3 wherein accessing a credit server includes accessing a credit server funded by a plurality of parties.

6. The method of claim 3 wherein accessing the credit server funded by the second party includes accessing the credit server via the cellular telephone network.

7. The method of claim 6 wherein accessing the credit server via the cellular telephone network includes accessing an Internet Protocol (IP) network-connected credit server, via the cellular network.

8. The method of claim 1 wherein uploading the credit includes uploading the credit in a message received via a common control channel selected from the group consisting of a Short Message Service (SMS) message and a paging channel message.

9. The method of claim 1 wherein uploading the credit includes uploading the credit via an interface selected from the group consisting of a hardwire, Bluetooth, IEEE 802.11, and IEEE 802.15 interface.

10. The method of claim 1 wherein uploading the credit includes automatically receiving a credit upload message from a credit server in response to registering with the cellular telephone network.

11. The method of claim 1 wherein uploading the credit includes:
  initializing a credit request; and,
  uploading the credit in response to the request.

12. The method of claim 11 wherein initializing the credit request includes:
  accessing a URL associated with a second party;
  downloading a form;
  populating the form; and,
  submitting the populated form to the URL.

13. The method of claim 11 wherein initializing the credit request includes:
  establishing a call to a telephone number associated with a second party;
  receiving prompts via the call; and,
  responding to the prompts.

14. The method of claim 1, wherein the account balance comprises a prepaid account balance stored on the UT.

15. The method of claim 1, wherein the registering further comprises registering with respect to a first party in possession of the UT.

16. The method of claim 1, wherein the registering further comprises registering with respect to a first party in possession of the UT, wherein the account balance comprises a prepaid account balance stored on the UT, and further comprising permitting use of a cellular network service from the cellular telephone network if the prepaid account balance has a positive balance, and debiting the prepaid account balance in response to use of the cellular network service.

17. A user terminal (UT) with a managed cellular telephone network account, the UT comprising a processor and a memory, the UT comprising:
  a cellular subsystem executable by the processor having a wireless interface for registering the UT having a plurality of accounts in a cellular telephone network, wherein the UT is associated with a first party; and,
  an account module, executable by the processor having an interface for:
    selecting an account from the plurality of accounts;
    receiving a credit for a cellular network service;
    converting the credit to an account balance associated with the selected account;
    accessing the cellular telephone network service;
    creating a notification associating the cellular telephone network service with the selected account;
    sending the notification to the cellular telephone network; and
    debiting the account balance associated with the selected account.

18. The UT of claim 17 wherein the account module receives cellular network service credits from a plurality of parties, where each party is associated with a unique account.

19. The UT of claim 17 wherein the account module accesses a credit server funded by a second party and uploads credit in response to accessing the credit server.

20. The UT of claim 17 wherein the account module accesses a credit server funded by a plurality of parties and uploads credit in response to accessing the credit server.

21. The UT of claim 19 further comprising:
  a credit server embedded in the UT having an interface connected to the account module.

22. The UT of claim 19 wherein the account module accesses a cellular network-connected credit server via the cellular subsystem.

23. The UT of claim 17 further comprising:
  a auxiliary subsystem selected from the group consisting of a hardwire, Bluetooth, IEEE 802.11, and IEEE 802.15 interface; and,
  wherein the account module has an interface connected to the auxiliary subsystem for receiving credit uploads.

24. The UT of claim 17, wherein the account balance comprises a prepaid account balance stored on the UT.

25. The UT of claim 17, wherein the wireless interface is further operable for registering the UT with respect to a first party in possession of the UT.

26. The UT of claim 17, wherein the wireless interface is further operable for registering the UT with respect to a first party in possession of the UT, wherein the account balance comprises a prepaid account balance stored on the UT, wherein the account module is further operable to permit use of a cellular network service from the cellular telephone network if the prepaid account balance has a positive balance, and wherein the account module is further operable to debit the prepaid account balance in response to the use of the cellular network service.

27. A system for managing a cellular telephone network user terminal (UT) account, the system comprising:
  a UT comprising:
    a cellular subsystem having a wireless interface for registering the UT having a plurality of accounts in a cellular telephone network, wherein the UT is associated with a first party;
    an account module having an interface for:
      selecting an account from the plurality of accounts;
      receiving a credit for a cellular network service;
      converting the credit to an account balance associated with the selected account;
    an interface connected to the cellular subsystem for authorizing the cellular network service in response to the account balance; and,
    the account module further having an interface for:
      accessing the cellular telephone network service;
      creating a notification associating the cellular telephone network service with the selected account;
      sending the notification to the cellular telephone network; and
      debiting the account balance associated with the selected account; and
  a credit server having an Internet Protocol (IP) network interface operatively connected to the UT account module to supply the credit.

28. The system of claim 27 wherein the credit server IP network interface is connected to the cellular network; and, wherein the account module receives credit uploads from the credit server via the cellular subsystem.

29. The system of claim 27 further comprising:
  a UT auxiliary subsystem selected from the group consisting of a hardwire, Bluetooth, IEEE 802.11, and IEEE 802.15 interface, for receiving credits from the credit server IP network interface; and,
  wherein the account module has an interface connected to the auxiliary subsystem for receiving credit uploads from the credit server.

30. The system of claim 27, wherein the account balance comprises a prepaid account balance stored on the UT.

31. The system of claim 27, wherein the wireless interface is further operable for registering the UT with respect to a first party in possession of the UT.

32. The system of claim 27, wherein the wireless interface is further operable for registering the UT with respect to a first party in possession of the UT, wherein the account balance comprises a prepaid account balance stored on the UT, wherein the account module is further operable to authorize use of the cellular network services if the prepaid account balance has a positive balance, and wherein the account module is further operable to debit the prepaid account balance in response to the use of the cellular network services.

33. An apparatus comprising:
  means for registering a user terminal (UT) having a plurality of accounts in a cellular telephone network, wherein the UT is associated with a first party;
  means for selecting an account from the plurality of accounts;
  means for uploading a credit to the selected account for a cellular telephone network service;
  means for converting the credit to an account balance associated with the selected account;
  means for accessing the cellular telephone network service;
  means for creating a notification associating the cellular telephone network service with the selected account;
  means for sending the notification to the cellular telephone network; and
  means for debiting the account balance associated with the selected account.

34. The apparatus of claim 33 wherein uploading credit includes uploading credit from a plurality of parties, where each party is associated with a unique account.

35. The apparatus of claim 33 further comprising:
  means for accessing a credit server funded by a second party; and,
  wherein the means for uploading the credit further comprises means for uploading the credit in response to accessing the credit server.

36. A non-transitory computer readable medium encoded with a computer program, the computer readable medium comprising:
  code for causing at least one computer to register a user terminal (UT) having a plurality of accounts in a cellular telephone network;
  code for causing at least one computer to select an account from the plurality of accounts;
  code for causing at least one computer to upload a credit to the selected account for a cellular telephone network service;
  code for causing at least one computer to convert the credit to an account balance associated with the selected account;
  code for causing at least one computer to access the cellular telephone network service;
  code for causing at least one computer to create a notification associating the cellular telephone network service with the selected account;
  code for causing at least one computer to send the notification to the cellular telephone network; and
  code for causing at least one computer to debit the account balance associated with the selected account.

37. The non-transitory computer readable medium of claim 36, wherein uploading credit includes uploading credit from a plurality of parties, where each party is associated with a unique account.

38. The non-transitory computer readable medium of claim 36, further comprising:
  code for causing at least one computer to access a credit server funded by a second party; and,
  wherein the code for causing at least one computer to upload the credit further comprises code for causing said at least one computer to upload the credit in response to accessing the credit server.

* * * * *